(12) United States Patent
Nuara et al.

(10) Patent No.: US 10,830,346 B2
(45) Date of Patent: Nov. 10, 2020

(54) CONTROL DEVICE FOR A VEHICLE GEARBOX

(71) Applicant: FCA Italy S.p.A., Turin (IT)

(72) Inventors: Vincenzo Nuara, Turin (IT); Paolo Mancin, Turin (IT)

(73) Assignee: FCA Italy S.p.A., Turin (IT)

( * ) Notice: Subject to any disclaimer, the term of this patent is extended or adjusted under 35 U.S.C. 154(b) by 192 days.

(21) Appl. No.: 16/101,858

(22) Filed: Aug. 13, 2018

(65) Prior Publication Data

US 2019/0219164 A1    Jul. 18, 2019

(30) Foreign Application Priority Data

Jan. 15, 2018  (EP) .................................... 18151667

(51) Int. Cl.
*F16H 61/22* (2006.01)
*F16H 59/10* (2006.01)
*F16H 59/02* (2006.01)

(52) U.S. Cl.
CPC ............. *F16H 61/22* (2013.01); *F16H 59/10* (2013.01); *F16H 2059/0282* (2013.01); *F16H 2061/223* (2013.01)

(58) Field of Classification Search
CPC .. F16H 61/22; F16H 59/10; F16H 2059/0282; F16H 2061/223; F16H 59/02
See application file for complete search history.

(56) References Cited

U.S. PATENT DOCUMENTS

| | | | |
|---|---|---|---|
| 2017/0059039 A1* | 3/2017 | Mitteer | F16H 61/22 |
| 2017/0219095 A1* | 8/2017 | Beattie | F16H 61/22 |
| 2018/0245690 A1* | 8/2018 | Kim | F16H 59/10 |
| 2018/0283543 A1* | 10/2018 | Cha | F16H 61/24 |

FOREIGN PATENT DOCUMENTS

| | | |
|---|---|---|
| DE | 10028649 A1 | 1/2002 |
| JP | 3096418 B2 | 10/2000 |

OTHER PUBLICATIONS

European Search Report for App. No. 18151667.5 dated Apr. 11, 2018, 3 pages.

* cited by examiner

*Primary Examiner* — David H Bollinger
(74) *Attorney, Agent, or Firm* — RMCK Law Group, PLC

(57) ABSTRACT

A device for controlling a gearbox includes a transmission member that transmits movement of a control lever to a control cable. A locking member, having a first and second portions for locking the lever in respective park and neutral positions, is mounted in a device casing. An actuator causes the locking member to rotate when the lever must be unlocked from park position and when the lever must be locked in neutral position. The device includes an anti-locking pawl mounted on the transmission member, having an operative position preventing the second portion from being received in a transmission member seat for locking the lever in the neutral position. If the lever is freed from park position and moved through the neutral position while the actuator is active, the pawl is pushed by the locking member into its operative position, thereby preventing unwanted locking of the lever in the neutral position.

4 Claims, 21 Drawing Sheets

PRIOR ART

PRIOR ART

P lock
Solenoid not energized

PRIOR ART

PRIOR ART

PRIOR ART

PRIOR ART

PRIOR ART

PRIOR ART

PRIOR ART

PRIOR ART

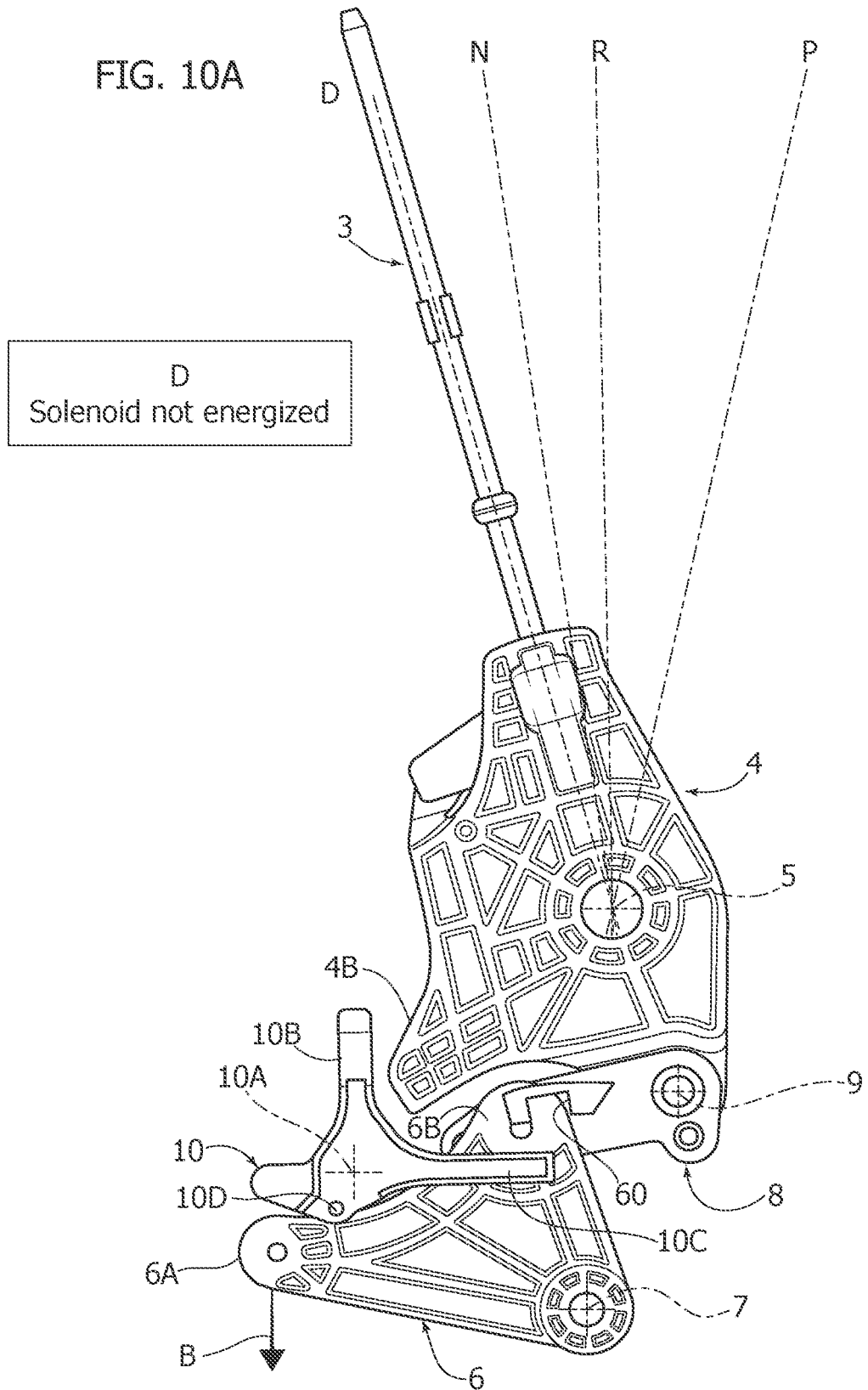

PRIOR ART

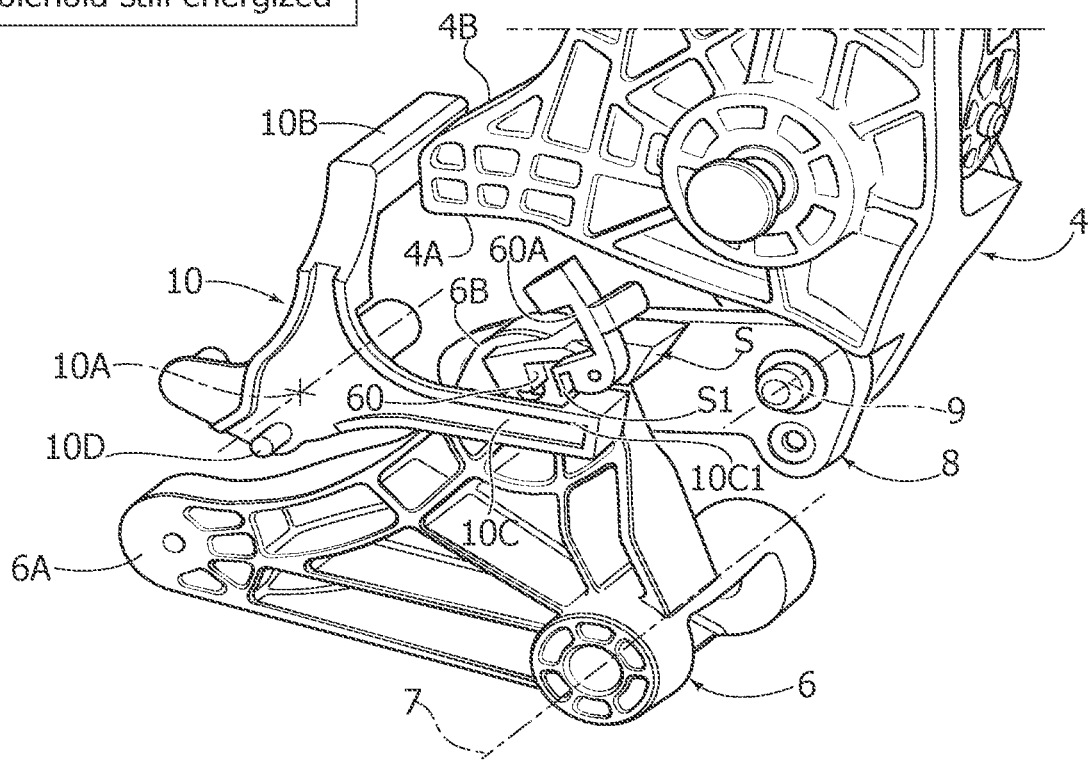
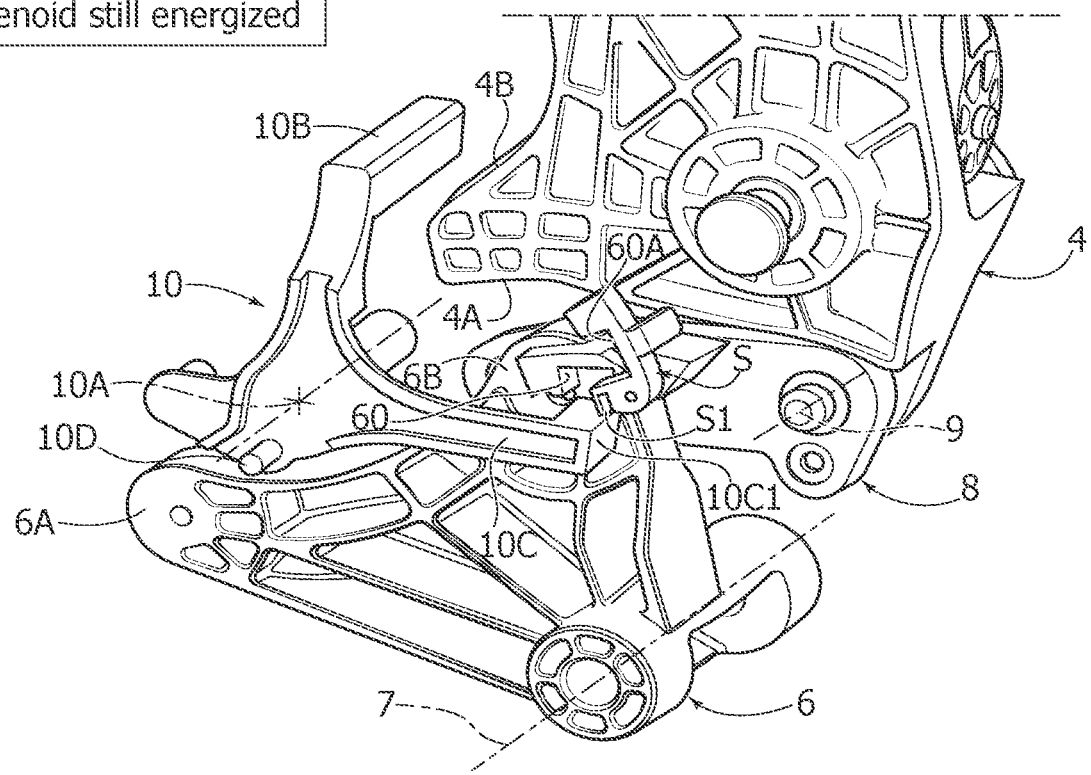

CONTROL DEVICE FOR A VEHICLE GEARBOX

CROSS-REFERENCE TO RELATED APPLICATION

This application claims priority to European Patent Application No. 18 151 667.5 filed Jan. 15, 2018. The disclosure of the above application is incorporated herein by reference in its entirety.

FIELD OF THE INVENTION

The present invention relates to a device for controlling a vehicle gearbox of the type comprising:
- a support casing,
- a control lever having a supporting body pivotally mounted about an oscillation axis within said support casing, and having parking (P), reverse (R), neutral (N) and drive (D) operating positions,
- a transmission member, pivotally mounted within said support casing and operatively connected to said supporting body of the control lever, said transmission member having a first portion for connecting a control cable of the gearbox,
- a locking member, pivotally mounted within said support casing, for locking the gearbox control lever in the parking position (P), said locking member being elastically recalled in a first oscillation direction, towards an operating position in which a first portion thereof interferes with said supporting body of the control lever, preventing it from moving away from the parking position (P),
- a solenoid actuator, for rotating said locking member in a second oscillation direction, to move it away from said operating position in which it locks the control lever in the parking position (P),
- wherein said locking member also has an additional operating position towards which it can be recalled by activation of said solenoid actuator, in which a second portion of the locking member is received in a cooperating seat of a second portion of said transmission member, for locking the control lever in the neutral position (N), and
- an electronic controller configured to activate said solenoid actuator when said control lever must be freed from a locked condition in the parking position (P) and when said control lever must be locked in the neutral position (N).

PRIOR ART

A gearbox control device having the characteristics indicated above has been produced and marketed by the Applicant for some time. When using this device, to move the control lever away from the parking position (P), the driver must first press the brake pedal of the motor-vehicle. Actuation of the brake pedal activates the aforesaid solenoid actuator, which causes the aforesaid locking member to pivot towards a release position, in which the control lever can be moved away from the parking position (P). The driver can sequentially move the control lever into the reverse (R), neutral (N) and drive (D) positions (the sequence of positions can also be different), depending on the driving needs. If the control lever is moved into the neutral position (N), and if it is left in this position beyond a predetermined time, the electronic controller causes activation of the aforesaid solenoid actuator again, which causes the aforesaid locking member to pivot into the aforesaid locking position of the control lever in the neutral position (N). In this condition, the control lever can only be released by pressing the brake pedal again. In this case, actuating the brake pedal causes deactivation of the solenoid actuator, so that the locking member is elastically recalled towards a position in which it allows the control lever to move away from the neutral position (N).

A drawback may occur in the aforesaid known device. When the control lever is released from the parking position and moved through the reverse (R), neutral (N) and drive (D) positions, during the passage through the neutral position (N), the solenoid actuator, which was activated to release the lever from the parking position, can still be active, as deactivation of the solenoid after removing the lever from the parking position is not instantaneous. In this case, the still active solenoid causes unexpected and unwanted locking of the control lever in the neutral position (N).

OBJECT OF THE INVENTION

The object of the present invention is to provide a control device of the type indicated above that is exempt from the aforementioned drawback.

An additional object of the invention is to provide a control device of the type specified above that achieves the aforesaid objective with a simple, reliable and low-cost structure.

SUMMARY OF THE INVENTION

In view of achieving the aforesaid objects, the invention relates to a control device for a vehicle gearbox having all of the characteristics disclosed at the beginning of this description and further characterized in that:
- an anti-locking pawl is pivotally mounted on the second portion of the transmission member, having:
  - an operative position in which it prevents the second portion of the locking member from being received within the aforesaid seat of the transmission member, and
  - an inoperative position, towards which it is elastically recalled, wherein said anti-locking pawl does not prevent the second portion of the locking member from being received within the aforesaid seat,
- said anti-locking pawl being configured in such a way that if the solenoid actuator remains active during the passage of the control lever from the parking position to the neutral position, the anti-locking pawl is engaged by said locking member and pushed into its operating position, so as to prevent unwanted locking of the control lever in the neutral position (N).

BRIEF DESCRIPTION OF THE DRAWINGS

Further characteristics and advantages of the invention will become apparent from the description that follows with reference to the attached drawings, provided by way of non-limiting example, wherein:

FIGS. 10A, 10B are a side view and an enlarged scale detailed view of the aforesaid components of the device, with the control lever in the drive position (D), FIGS. 12C, 12D are side views of the transmission member forming part of the device according to the invention, which show the anti-lock pawl in the rest position and in the operative position, FIG. 15 shows the components of the device according to the invention with the control lever in the reverse position (R), and FIG. 16 is a perspective figure that illustrates the components of the device according to the invention with the control lever in the neutral position (N), and the anti-locking pawl in the operative position in which it prevents unwanted locking of the control lever in said neutral position (N).

DETAILED DESCRIPTION OF A PREFERRED EMBODIMENT

FIGS. 1-11 of the attached drawings refer to a device for controlling a vehicle gearbox that is part of the prior art, since it has been produced and used for some time on vehicles marketed by the Applicant.

The preferred embodiment of the present invention differs from this known device primarily in the addition of an anti-locking pawl, illustrated, and indicated by S, in FIGS. 12-16. Therefore, the structure and much of the operation of the device according to the prior art remain unchanged, even in the device according to the invention. The description of the device according to the prior art is, therefore, also important for the understanding of the structure and operation of the device according to the invention.

Figure 1:
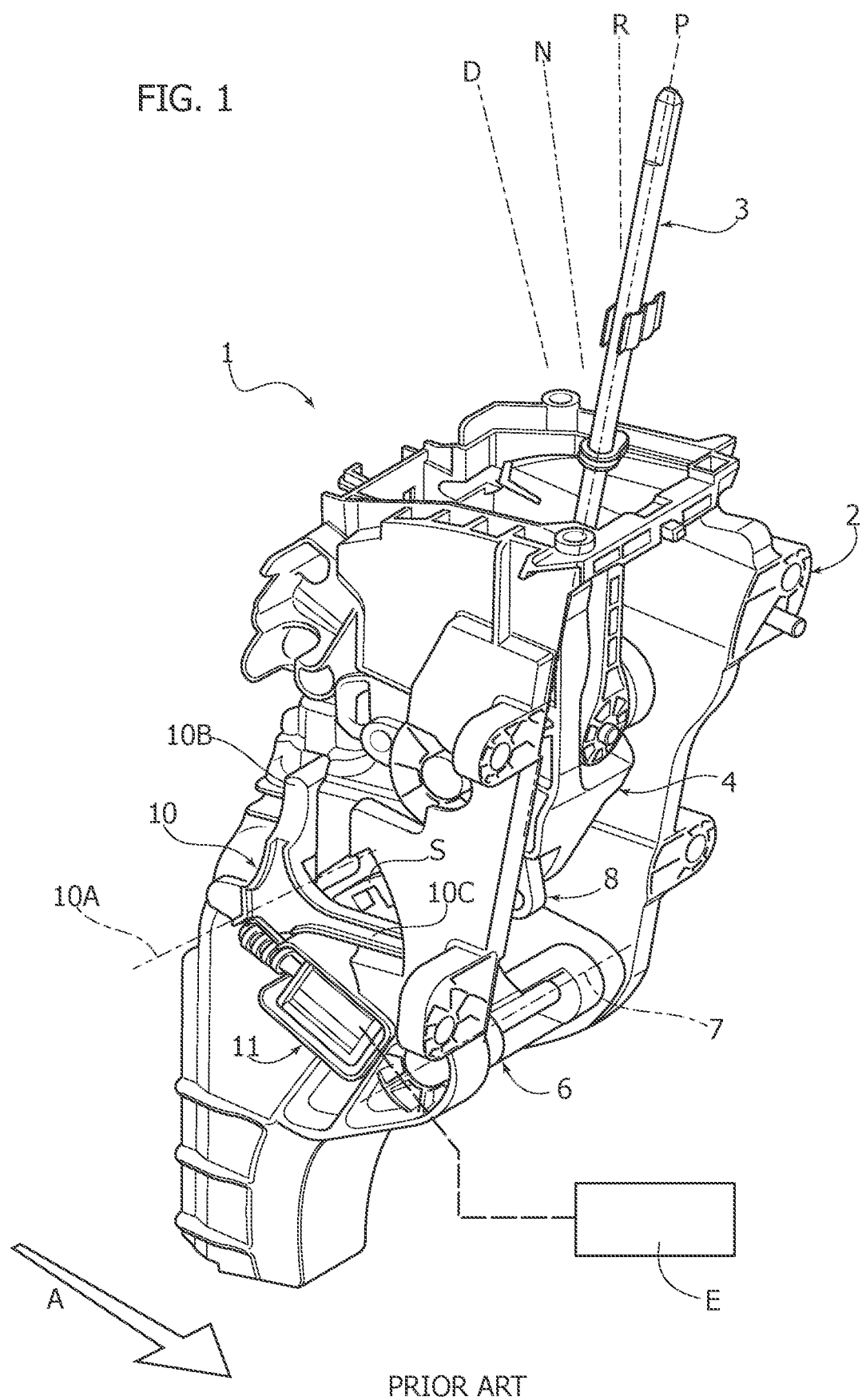
FIG. 1 is a perspective view of a preferred embodiment of a control device for a vehicle gearbox.
Figure 2:
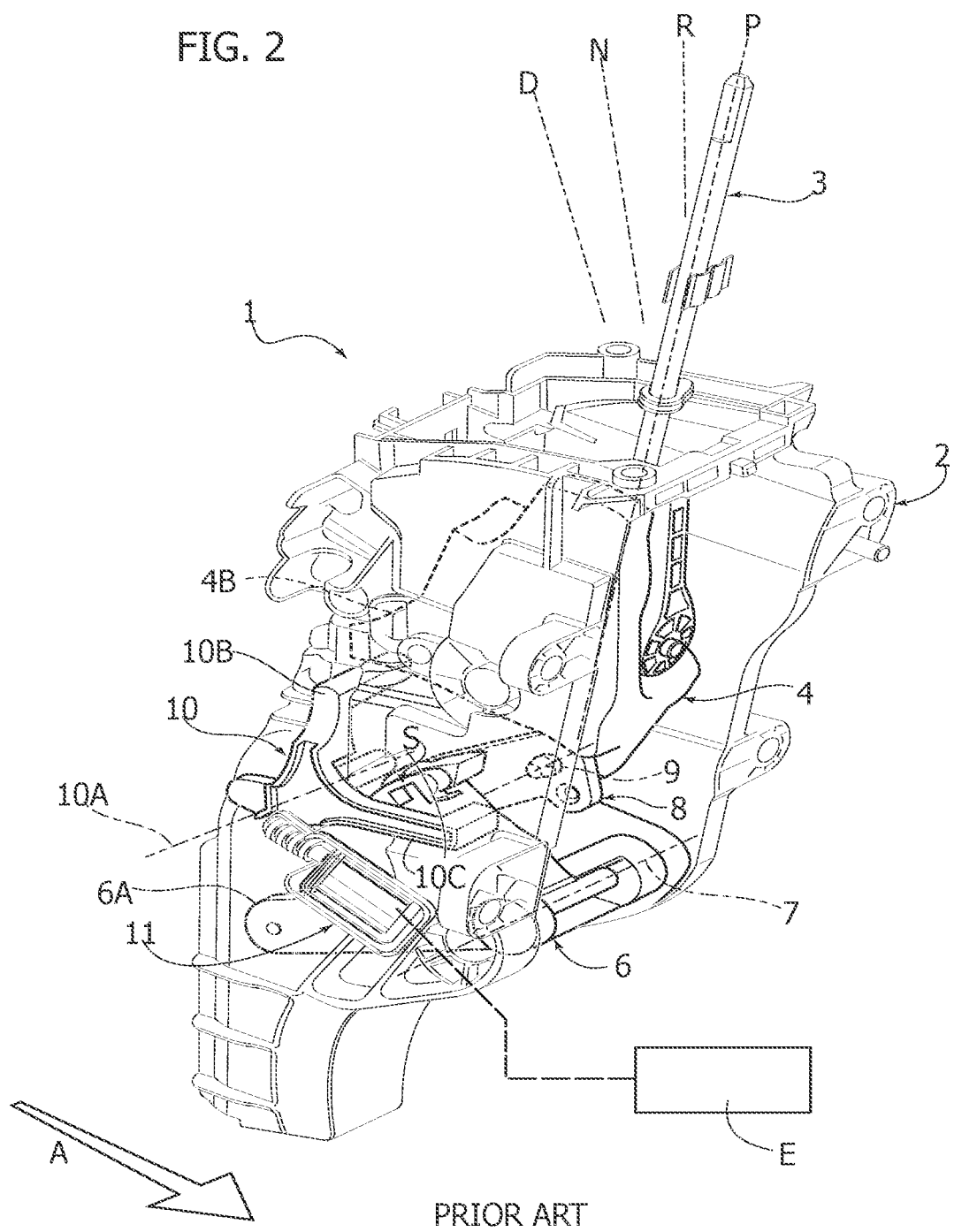
FIG. 2 is a view of the device of FIG. 1, in which some parts are illustrated in transparency, to show the internal parts of the device.

With reference to FIGS. 1 and 2, numeral 1 indicates—in its entirety—a device for controlling a vehicle gearbox, in particular an automatic gearbox or an electro-actuated gearbox. The device 1 comprises a support casing 2 of metal or plastic material, intended to be rigidly connected to the motor-vehicle structure. The reference number 3 indicates—in its entirety—the gearbox control lever, having an upper portion coming out of the casing 2 and an upper end (not shown in the drawings) provided with a handle. The control lever 3 is carried by a support 4 (see also FIG. 3), which is pivotally mounted within the casing 2 about an oscillation axis 5 that, in the mounted condition on the vehicle, is directed horizontally and transversely with respect to the longitudinal direction of the motor-vehicle (in FIGS. 1-3, the forward direction of vehicle is indicated by the arrow A).

The control lever 3 has four operating positions: a forward parking position (with reference to the forward direction of the vehicle) P, and starting from this, proceeding in the rearwards direction of the vehicle, a reverse position R, a neutral (or "idle") position N, and a drive position D. It should be noted that the sequence of positions could also be different from that illustrated herein, and the orientation of the control device with respect to the vehicle may also be different.

With reference to the embodiment illustrated herein, both the device according to the prior art and the device according to the invention also include a transmission member, indicated—in its entirety—by the reference number 6, which is rotatably mounted in the casing 2 about an oscillation axis 7 (see FIG. 3), parallel to the oscillation axis 5 of the support 4 of the gearbox control lever. The transmission member 6 has a first portion 6A (see FIG. 3) for connecting the gearbox control cable, indicated schematically by the arrow B in FIG. 3, and a second portion 6B, which is connected to the body 4 supporting the control lever 3 by means of a connecting rod 8 (see FIG. 3) having an end articulated to the portion 6B of the transmission member 6 and the opposite end articulated in 9 (FIG. 3) to the supporting body 4 of the control lever 3. Thanks to this arrangement, the transmission member 6 is operatively connected to the supporting body 4 of the control lever 3, in such a way that an oscillation of the body 4 about the axis 5 causes a corresponding oscillation of the transmission member 6 about the axis 7 and a corresponding movement of the gearbox control cable B. Accordingly, at each position P, R, N, D of the control lever 3, there is a corresponding different position of the transmission member 6 about its oscillation axis 7, and a different degree of actuation of the control cable B of the gearbox.

Still with reference both to the prior art device and to the preferred embodiment of the invention, the device 1 comprises a locking member 10 pivotally mounted about an oscillation axis 10A on the support casing 2 of the device 1.

The locking member 10 has a first portion, in the example—in the form of an arm 10B—serving to lock the control lever 3 in the parking position P, and a second portion, in the example—in the form of an arm 10C—serving to lock the control lever 3 in position N.

Figure 3:
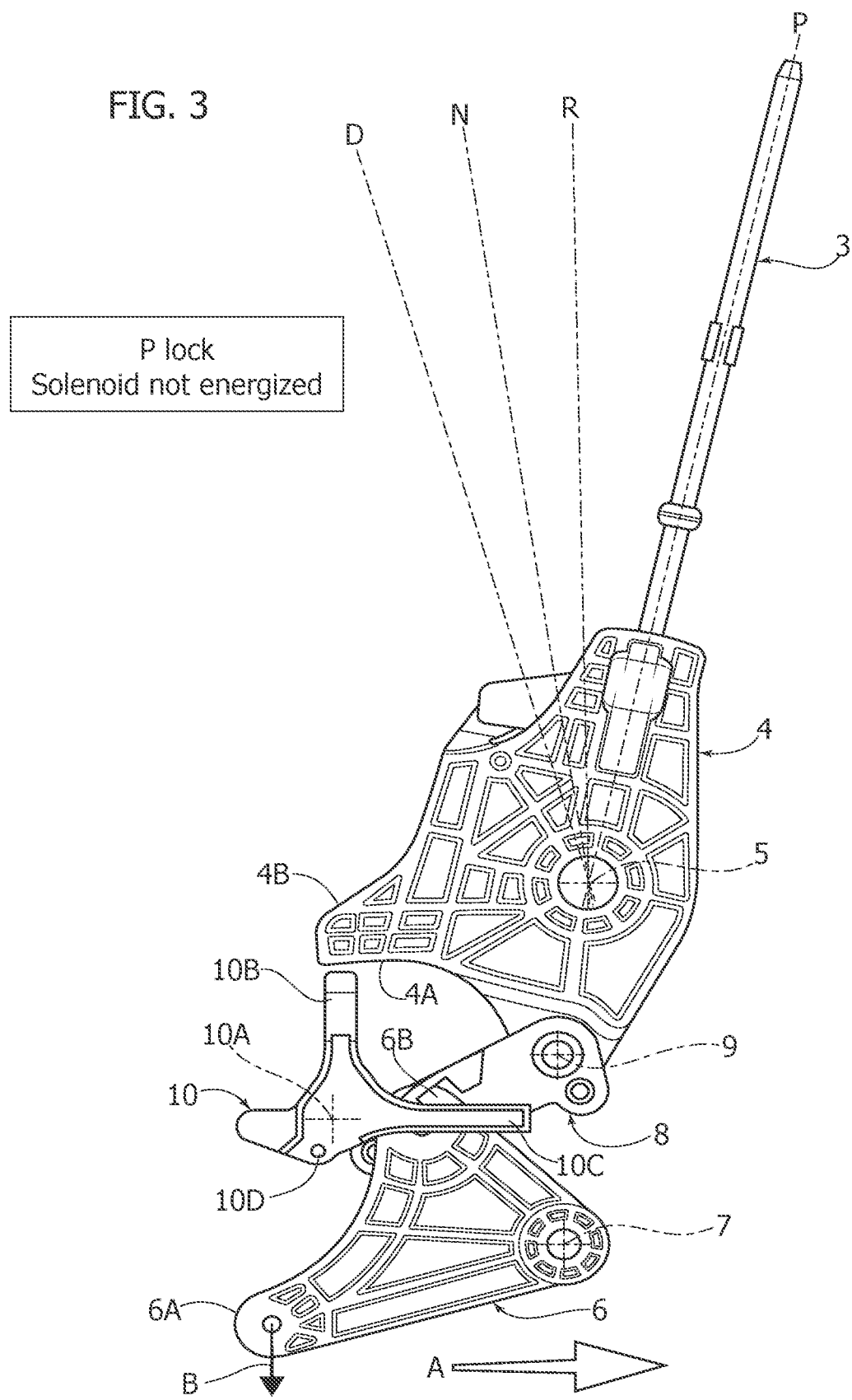
FIGS. 3, 4 are a side view and an enlarged scale detailed view of some components of the device, in the locked condition of the control lever in the parking position (P)
Figure 4:
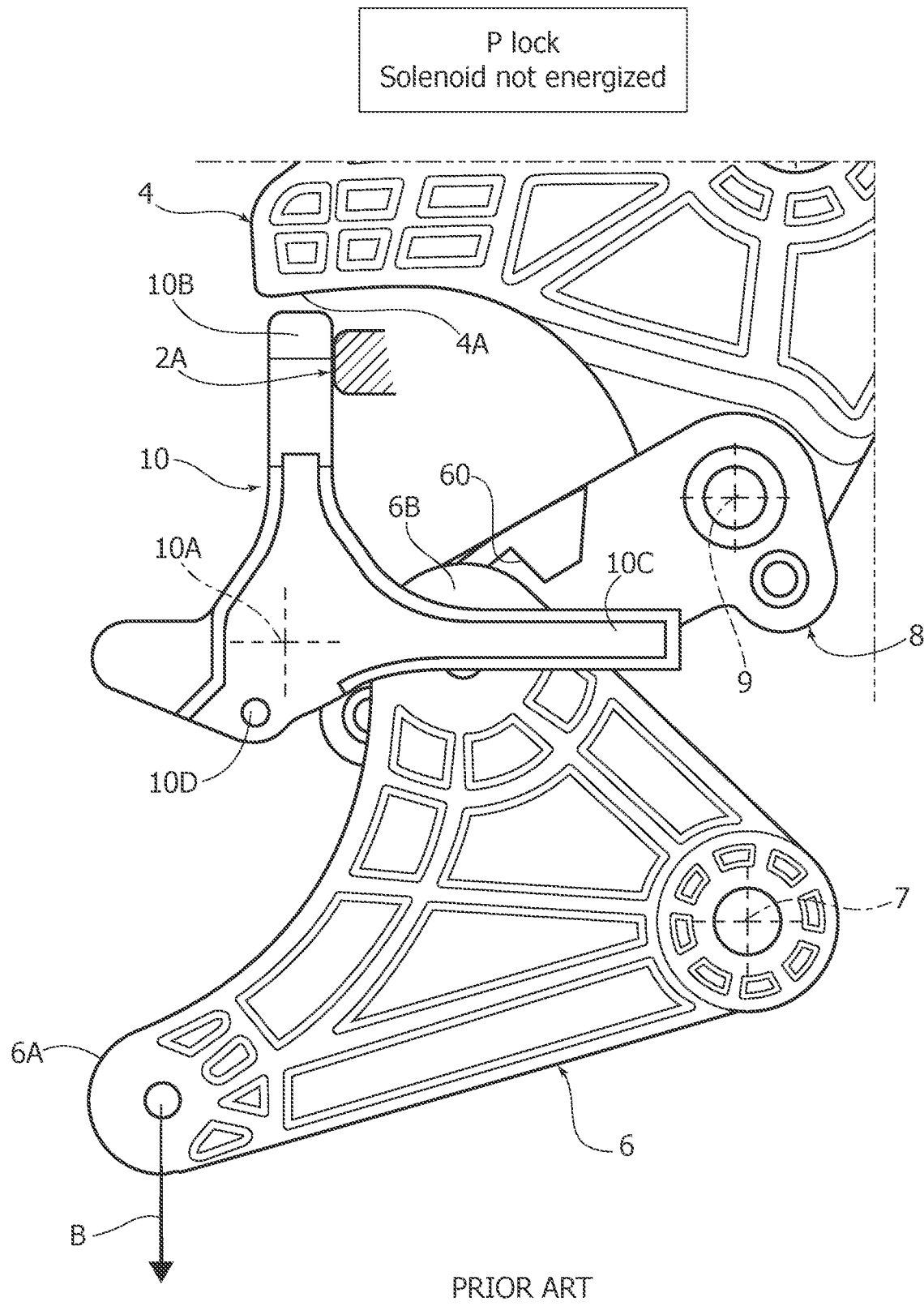

With reference to FIGS. 3 and 4, which show the control lever 3 in the parking position P and locked in this position, the locking member 10 is elastically recalled, by means of a spring integrated into the solenoid, in a clockwise oscillation direction (with reference to the drawings). In the condition illustrated in FIGS. 3 and 4, the spring therefore recalls the locking member 10 against a stop surface of the support casing 2, schematically illustrated and indicated with the reference 2A in FIG. 4. In this operative position, the arm constituting the first portion 10B of the locking member 10 is configured to interfere with a surface 4A of the body 4 supporting the control lever 3, so that the lever 3 cannot be moved away from the parking position P.

The locking member 10 can be rotated in an anti-clockwise direction (with reference to the drawings), activating a solenoid actuator 11 mounted on the support casing 2 and having a movable member connected to a peg 10D of the locking member 10 (see FIG. 4).

Figure 5:
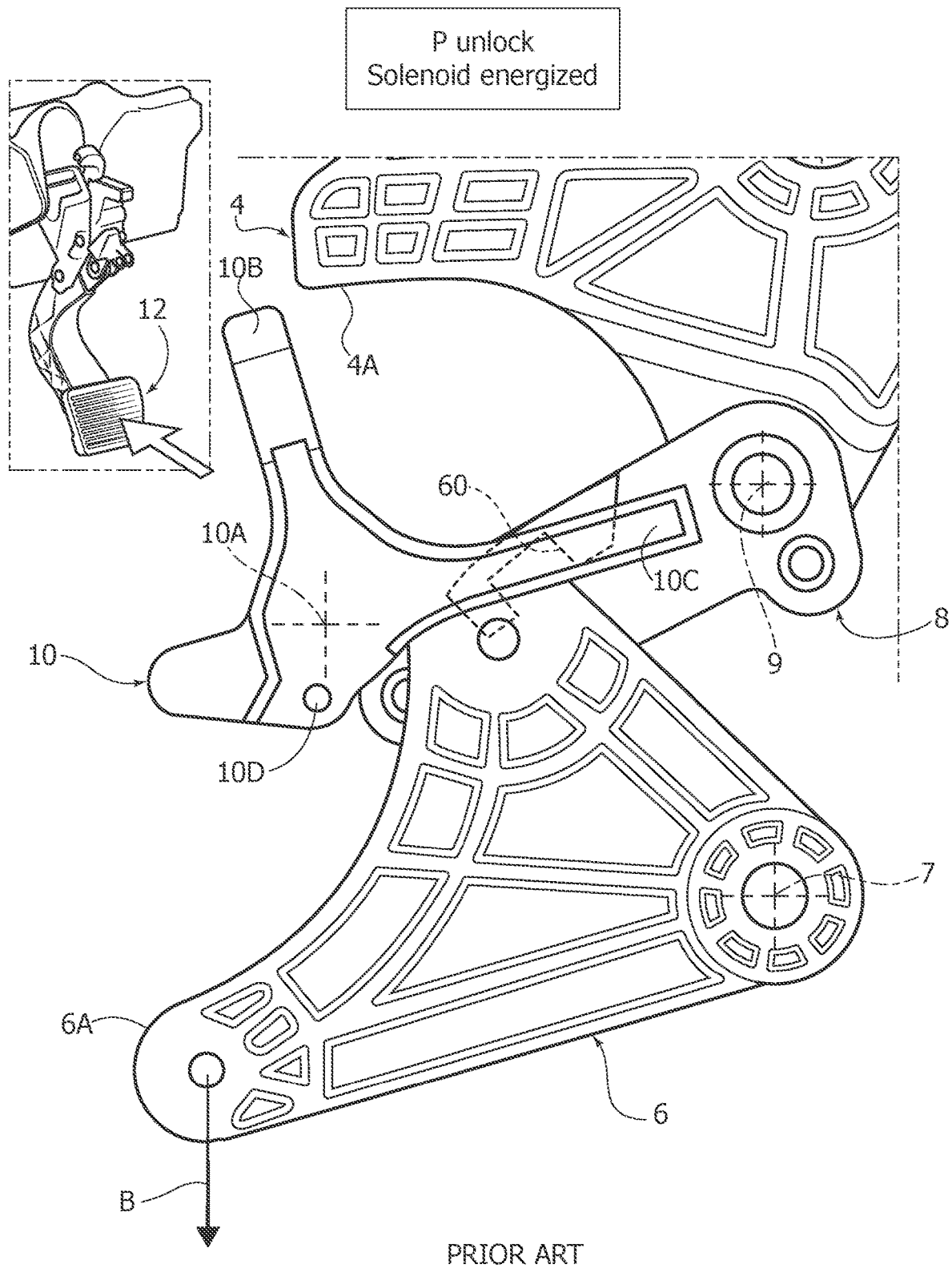
FIG. 5 shows the release condition of the control lever from the parking position, obtained by acting on the brake pedal of the motor-vehicle.
Figure 6A:
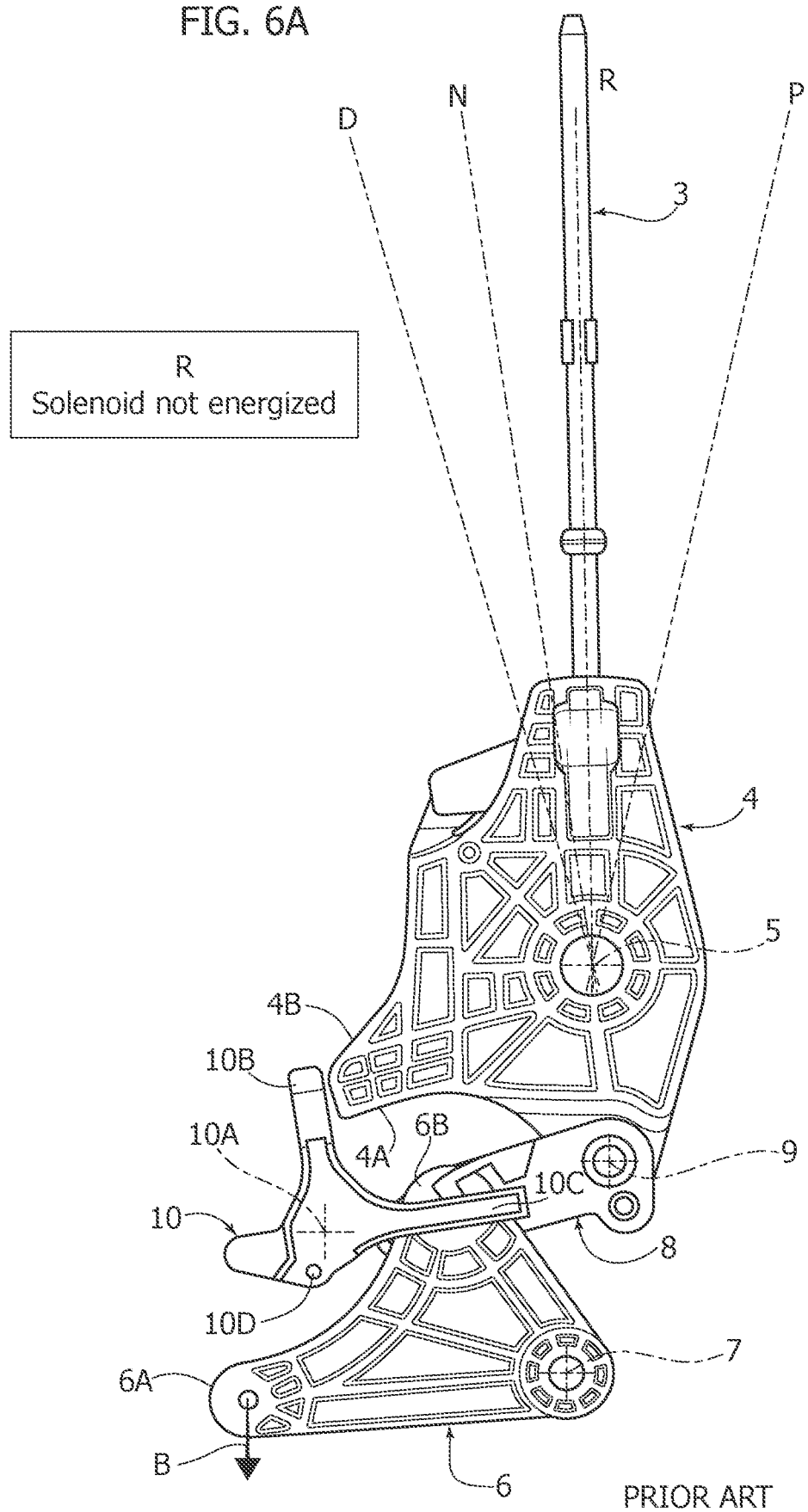
FIGS. 6A, 6B are a side view and an enlarged scale detailed view of the aforesaid components of the device, with the control lever in the reverse position (R)
Figure 6B:
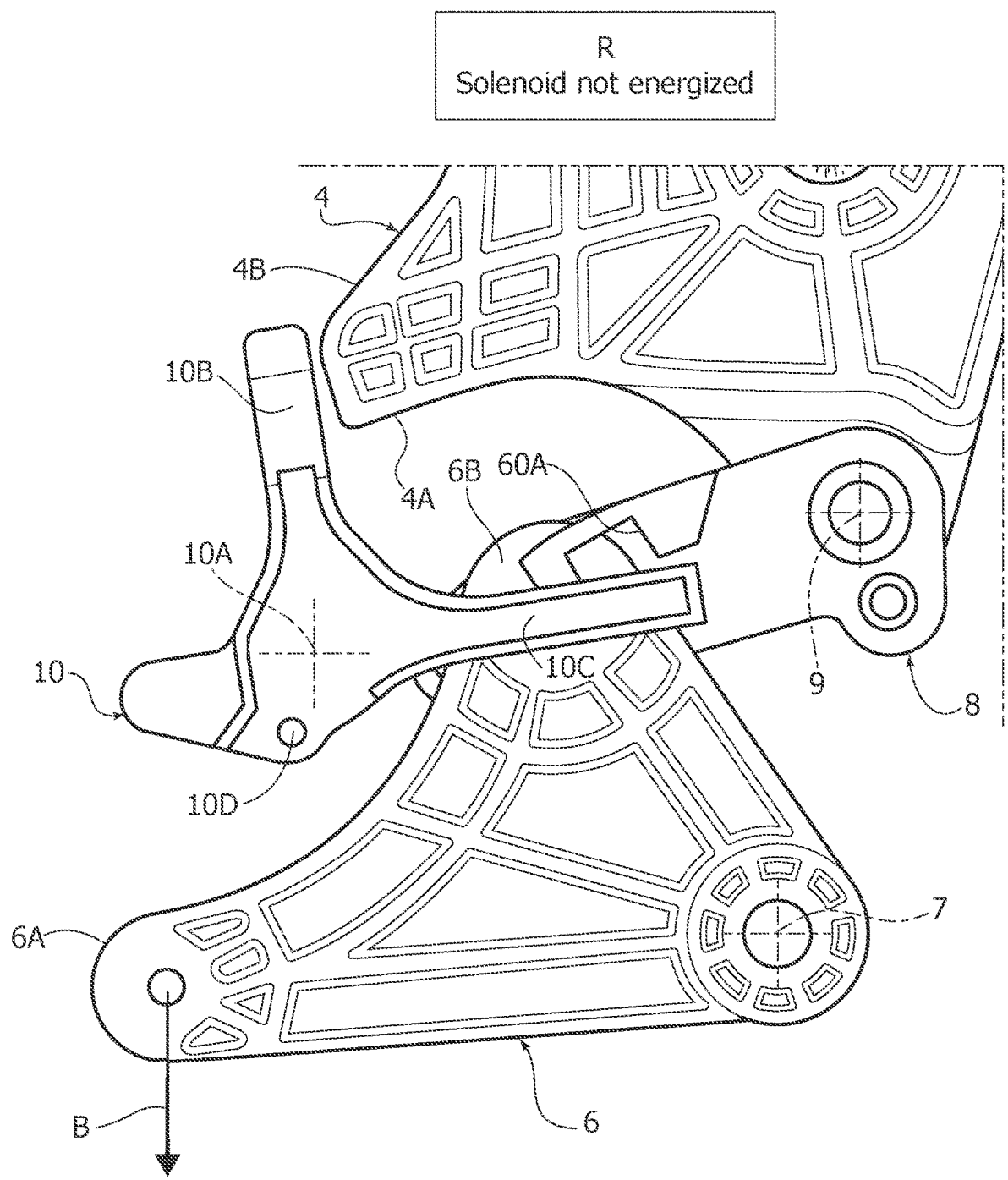

With reference to FIG. 5, to move the control lever 3 away from the parking position P in which it is locked, the driver must actuate the brake pedal 12. Actuating the brake pedal 12 is detected by a sensor, which sends a corresponding signal to an electronic controller E (schematically illustrated in FIGS. 1, 2) that, in this condition, controls the activation of the solenoid actuator 11. The movable member of the solenoid actuator 11, connected to the peg 10D of the locking member 10, rotates the locking member 10 in an anti-clockwise direction (with reference to FIG. 5), so that the arm constituting the first portion 10B of the locking member 10 exits the engagement with the surface 4A of the body 4 supporting the gearbox lever. In this condition, therefore, the lever is freed from the locked condition and can be moved away from the parking position P.

Figure 9A:
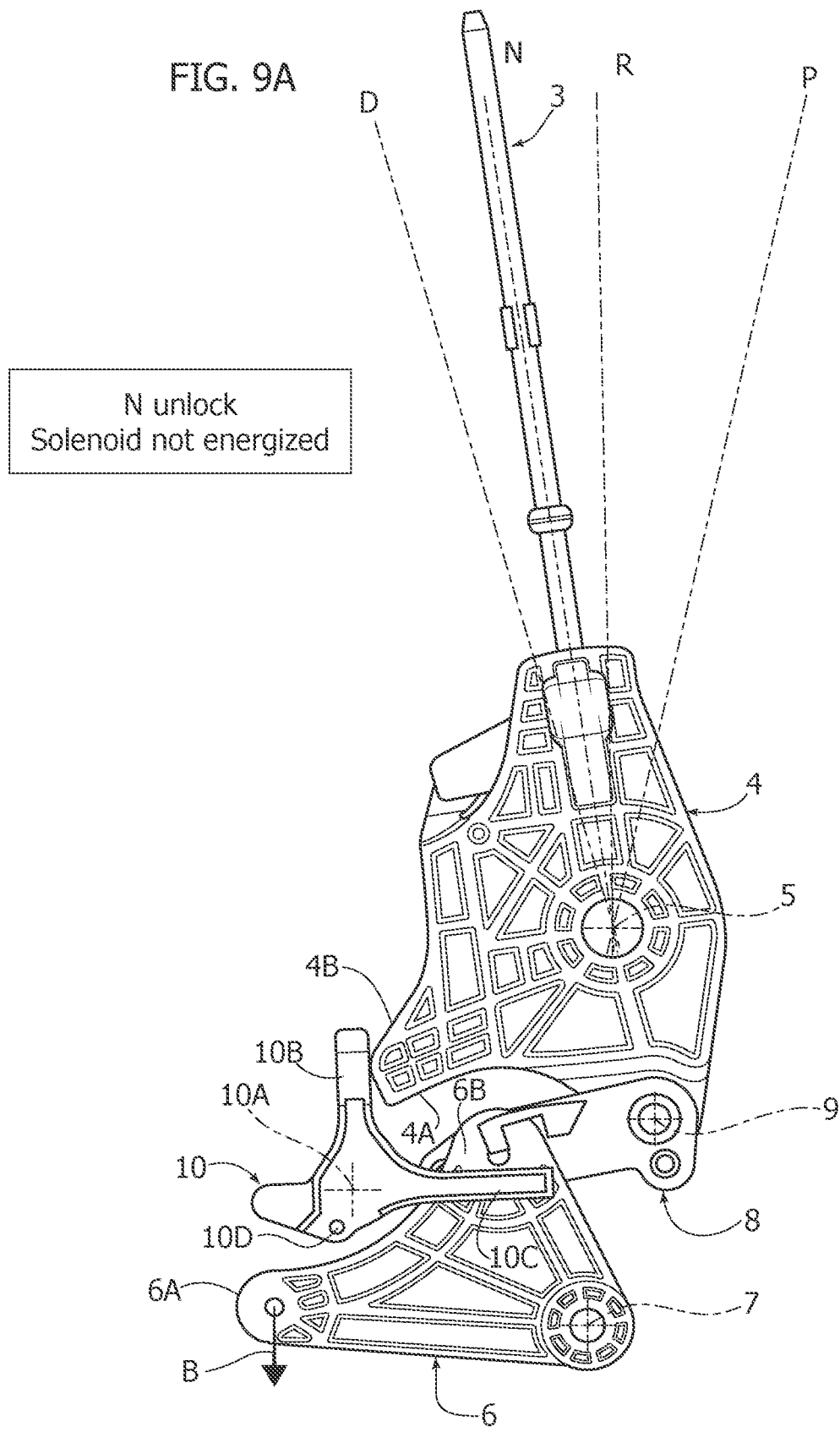
FIGS. 9A, 9B are a side view and an enlarged scale detailed view of the aforesaid components of the device, with the lever in the neutral position (N) and in a condition released from the locked condition, obtained by actuating the brake pedal of the motor-vehicle.
Figure 9B:
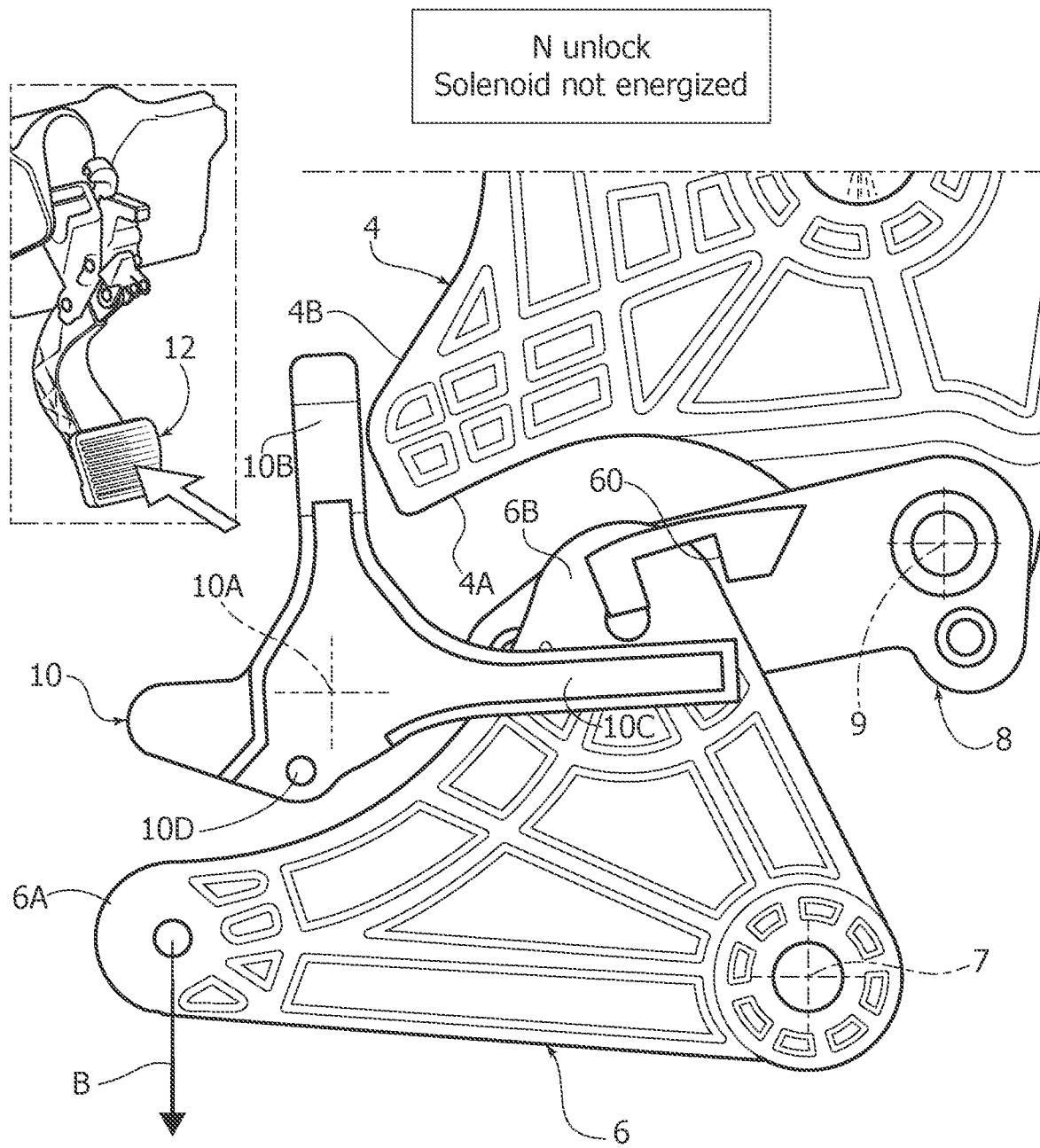
Figure 10B:
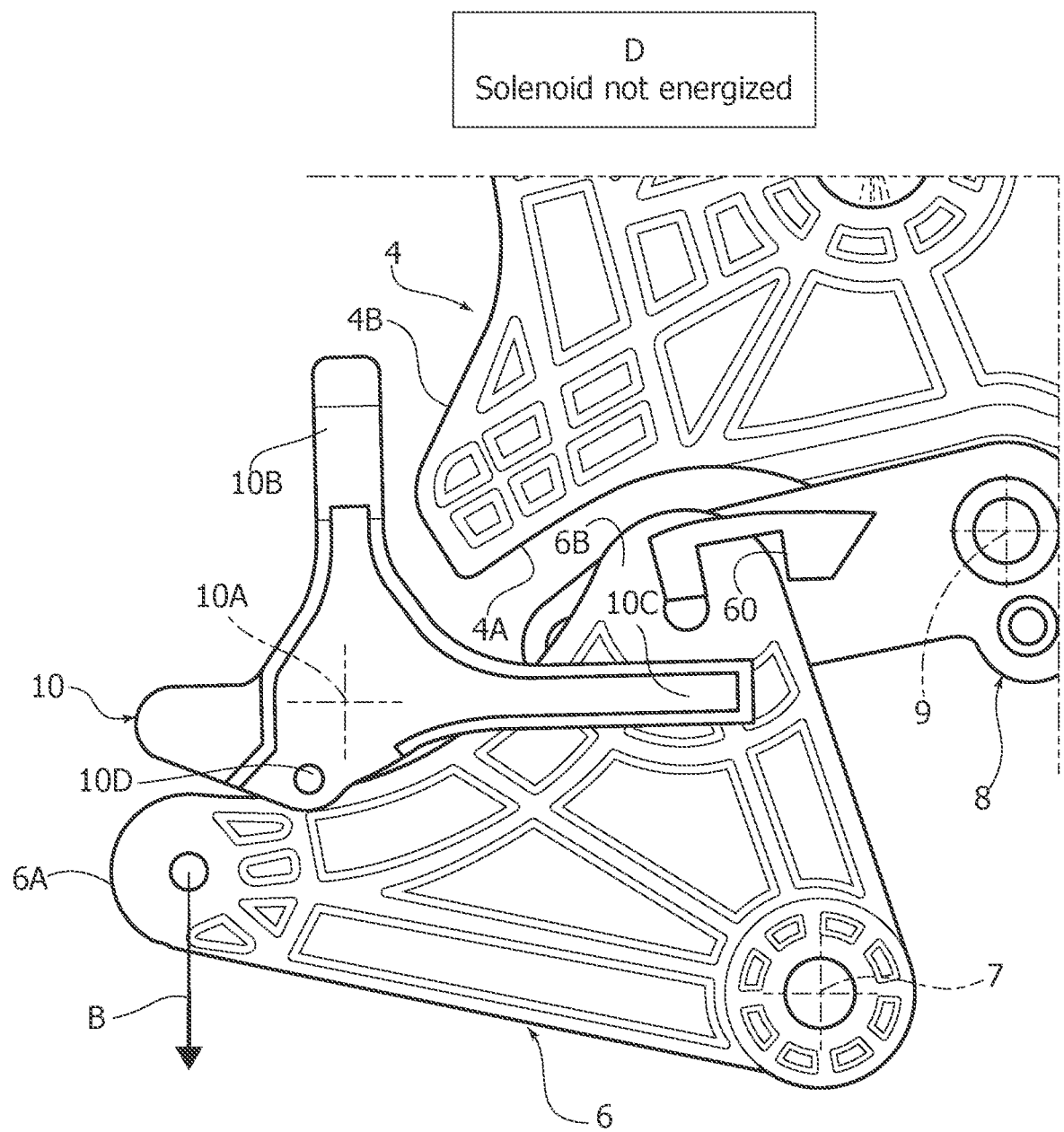

Once the parking position P is released, the control lever 3 can be moved successively rearwards into the positions R (FIGS. 6A, 6B), N (FIGS. 7A, 7B), and D (FIGS. 9A, 9B). During this movement, the solenoid actuator 11 is now deactivated, and in this deactivated condition cannot cause drawbacks, since the arm constituting the first portion 10B of the locking member D is now disengaged with the surface 4A of the control lever supporting body 4, and can slide against a surface 4B of the body 4 (see FIGS. 6B, 7B and 10B).

Figure 7A:
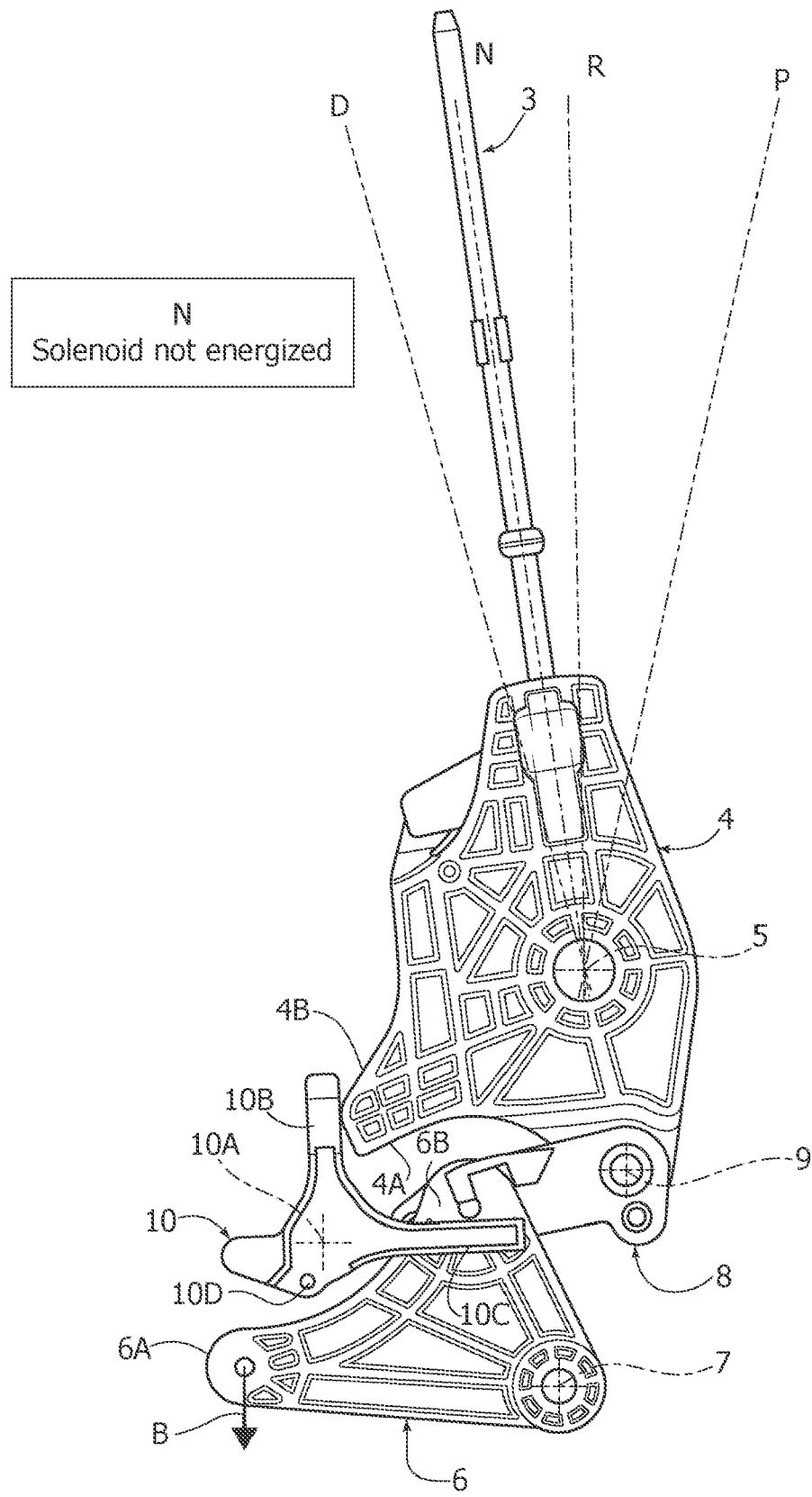
FIGS. 7A, 7B are a side view and an enlarged scale detailed view of the same components of the device, with the lever in the neutral and unlocked position (N)
Figure 7B:
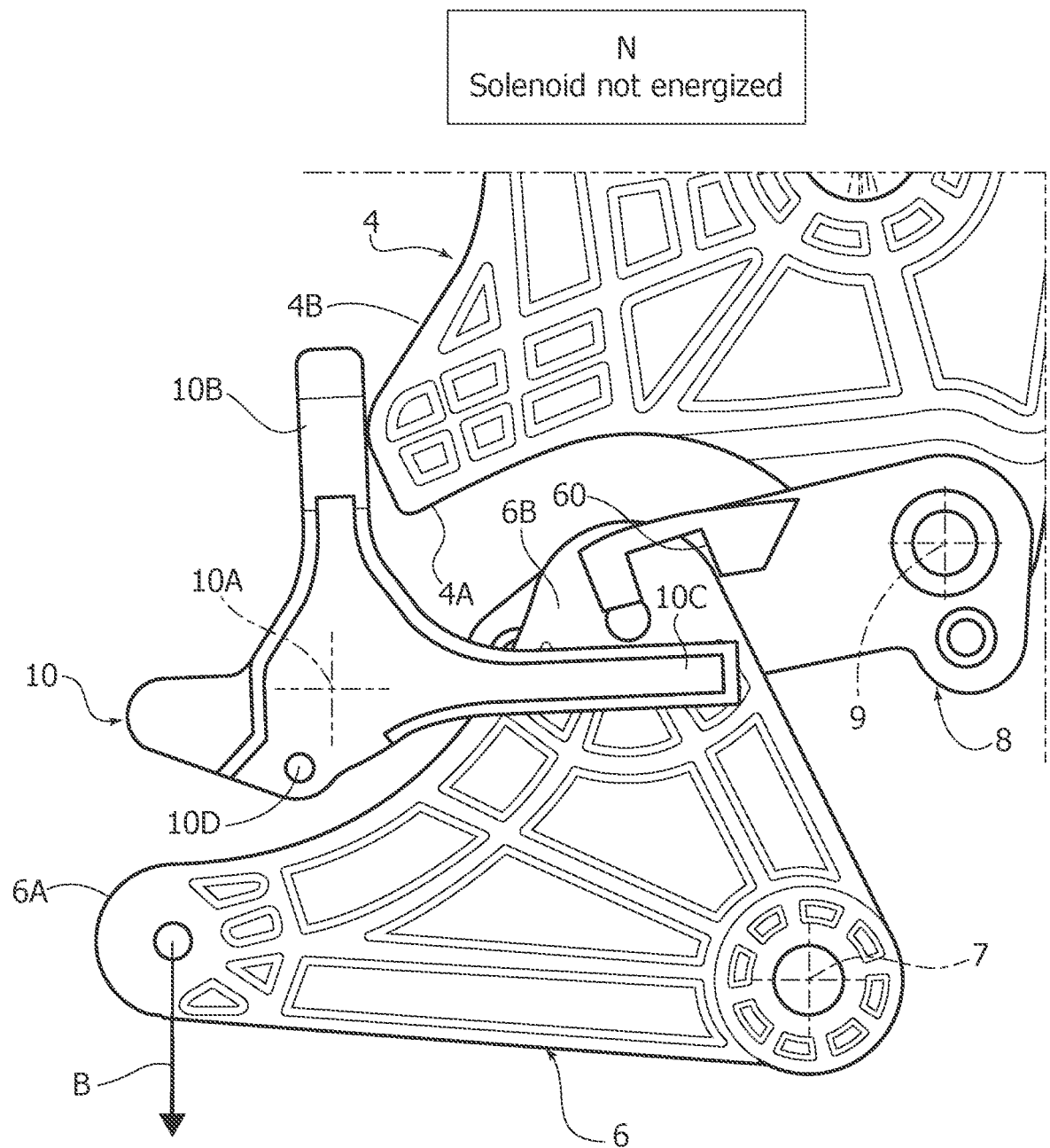

Supposing, for example, that the control lever 3 is moved from position P to position D, it reaches position D after passing through position R (FIG. 6B) and position N (FIG. 7B). As indicated above, during this movement, the solenoid actuator, which had been activated to release the lever from position P has—in the meantime—been deactivated, so that it does not give rise to problems of the type that will be discussed hereinafter.

Figure 8A:
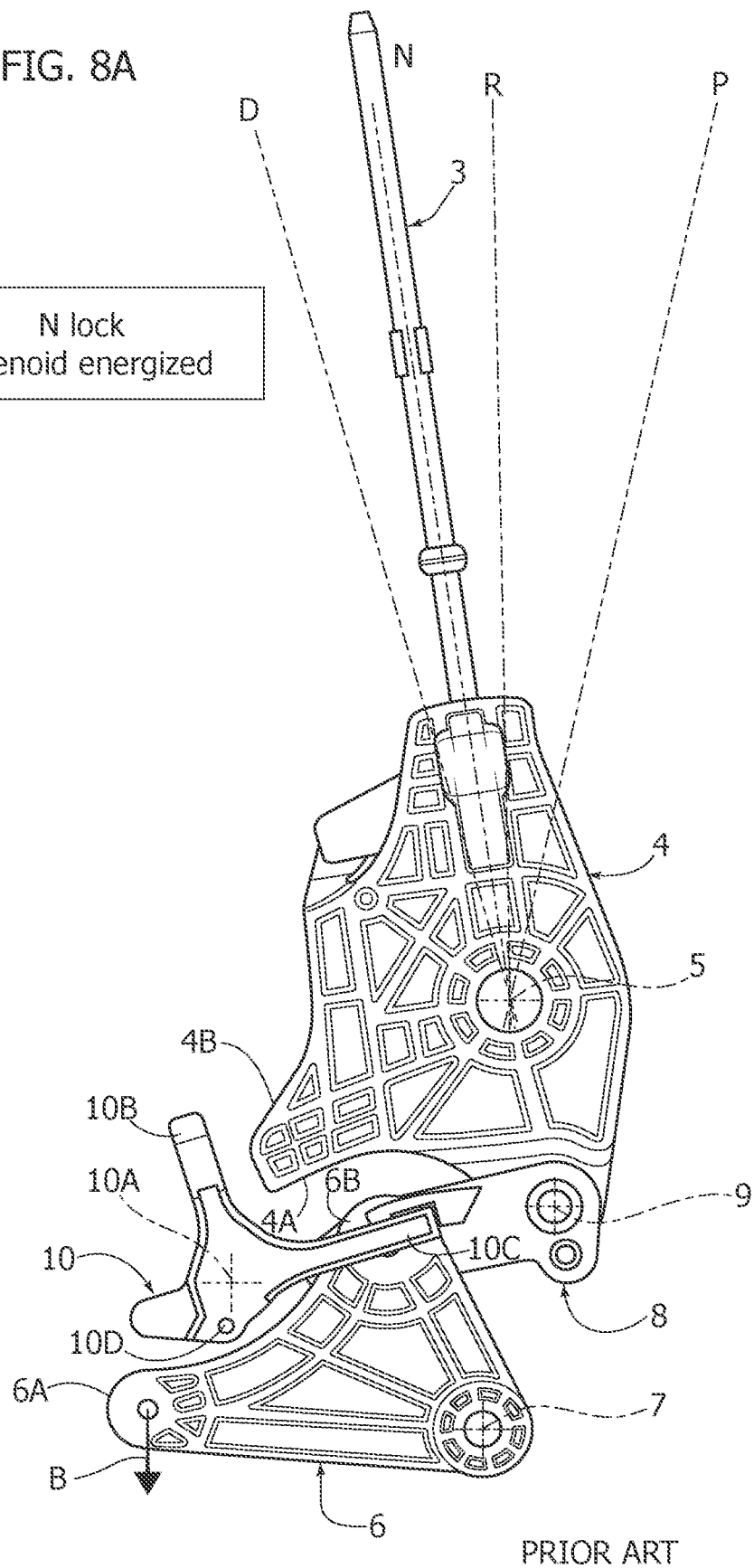
FIGS. 8A, 8B are a side view and an enlarged scale detailed view of the aforesaid components of the device, with the control lever locked in the neutral position (N)
Figure 8B:
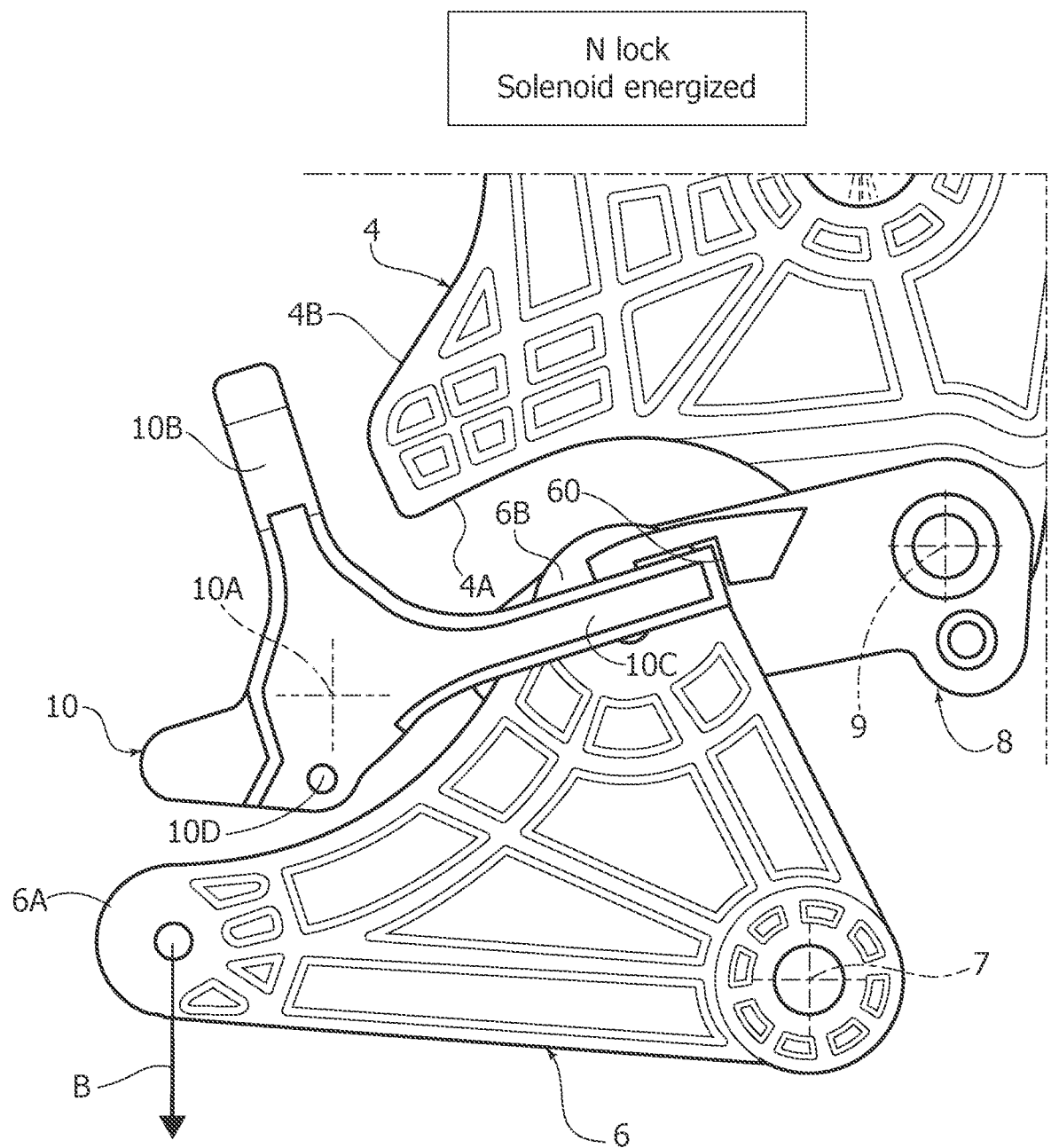

Both in the device according to the prior art and in the device of the invention, it is envisaged that if the control lever 3 is moved into the neutral position N and maintained in this position beyond a certain time interval, the lever 3 is locked in this position. This condition is illustrated in FIGS. 8A, 8B. With the lever 3 in position N for a time exceeding a determined time interval, the electronic controller E controls activation of the solenoid actuator 11, which rotates the locking member 10 in an anti-clockwise direction (with reference to the drawings) in such a way that a tooth 10C1 (visible in a perspective view in FIGS. 13-16 relating to the device according to the invention), carried by the arm constituting the second portion 10C of the locking member 10, is received in a cooperating seat 60 formed in the second portion 6B of the transmission member 6 (the seat 60 is clearly visible, for example, in FIG. 4 and in FIGS. 6B, 7B, 8B, 9B, 10B and 11B). In this condition, the locking member 10 locks the transmission member 6 in position and consequently locks the body 4 and the control lever 3 in position. In this condition, if the driver wants to move out of position N, it is necessary to operate the brake pedal 12 again (FIGS. 9A, 9B). Following actuation of the brake pedal 12, the electronic controller E causes deactivation of the solenoid actuator 11, so that, when the solenoid is deactivated, the locking member 10 is rotated clockwise by its return spring and the tooth 10C1 of the arm 10C of the locking member 10 is disengaged from the seat 60. In this condition, the control lever 3 can be moved away from position N and moved into any other position, for example, position D or position R or position P.

The description of the structure and the operation described above refers both to the device of the prior art and to the device according to the invention.

Figure 11A:
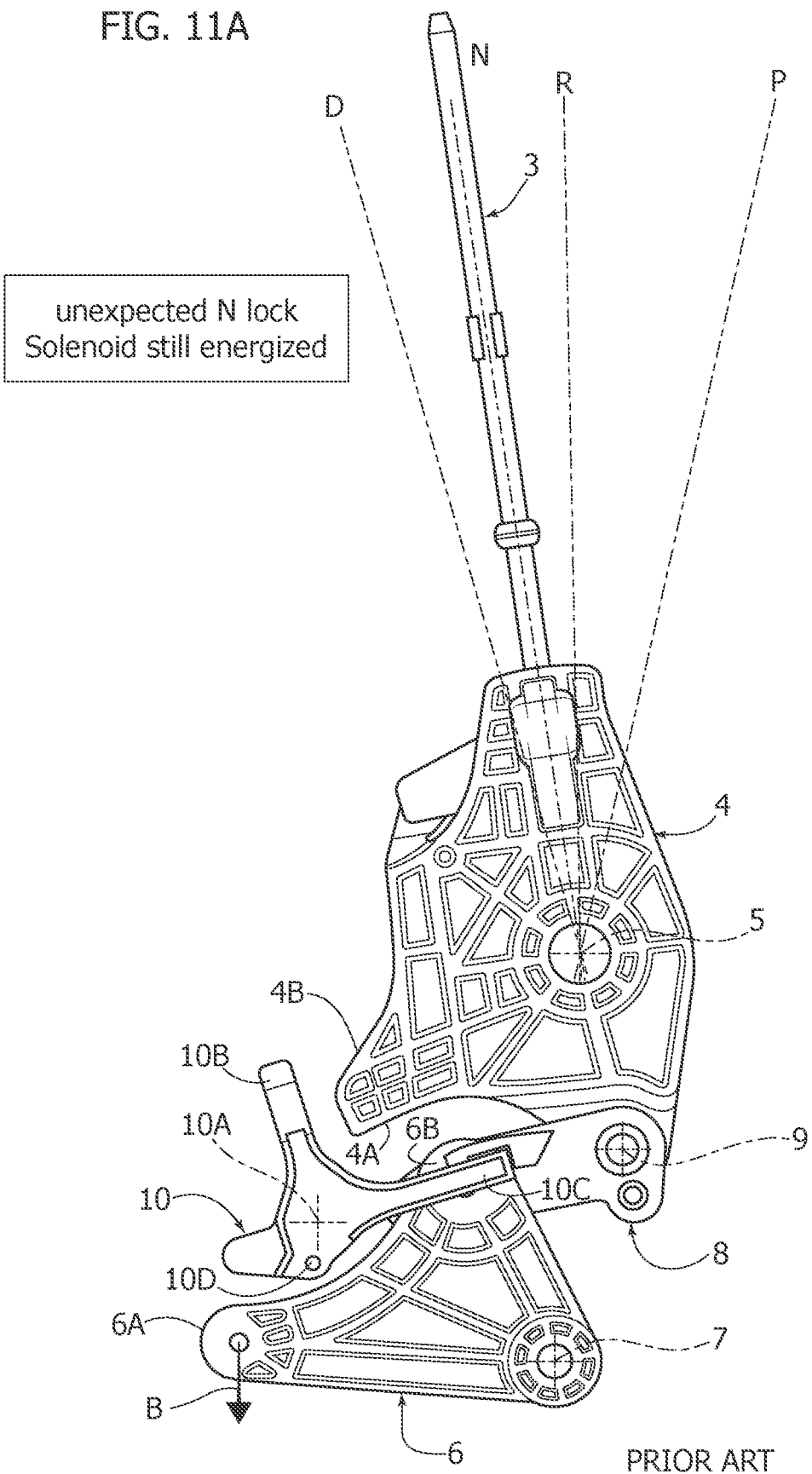
FIGS. 11A, 11B are a side view and an enlarged scale detailed view of the aforesaid components of the device, which shows the drawback of the known solution, in which the control lever is in an unwanted locking condition in the neutral position (N)
Figure 11B:
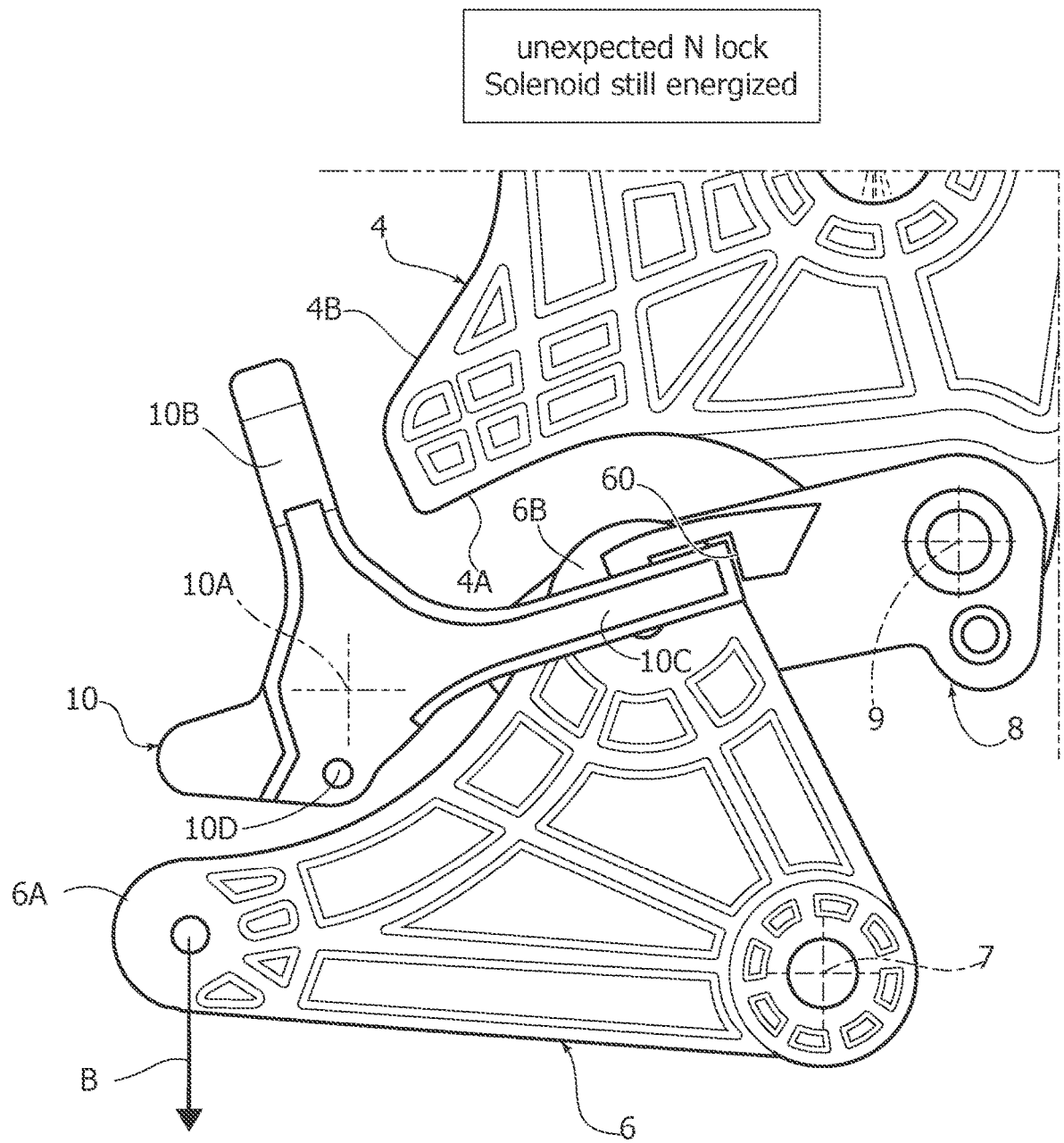

In the case of the prior art device, the disadvantage, illustrated in FIGS. 11A and 11B, occurs. If, for example, the driver moves from position P to position D, after releasing the lever from the locked position in the parking position P, when the lever passes through position N, the solenoid actuator 11, which was activated to release the lever 3 from the parking position P, may still be active. In this condition, when position N is reached, the locking member 10 is recalled to rotate anticlockwise (with reference to the drawings) so that the tooth 10C1 carried by the arm 10C engages in the seat 60 of the transmission member 6, causing unexpected and unwanted locking of the control lever 3 in position N.

In order to avoid this drawback, the device according to the invention envisages the provision of an anti-locking pawl S on the transmission member 6.

Figure 12A:
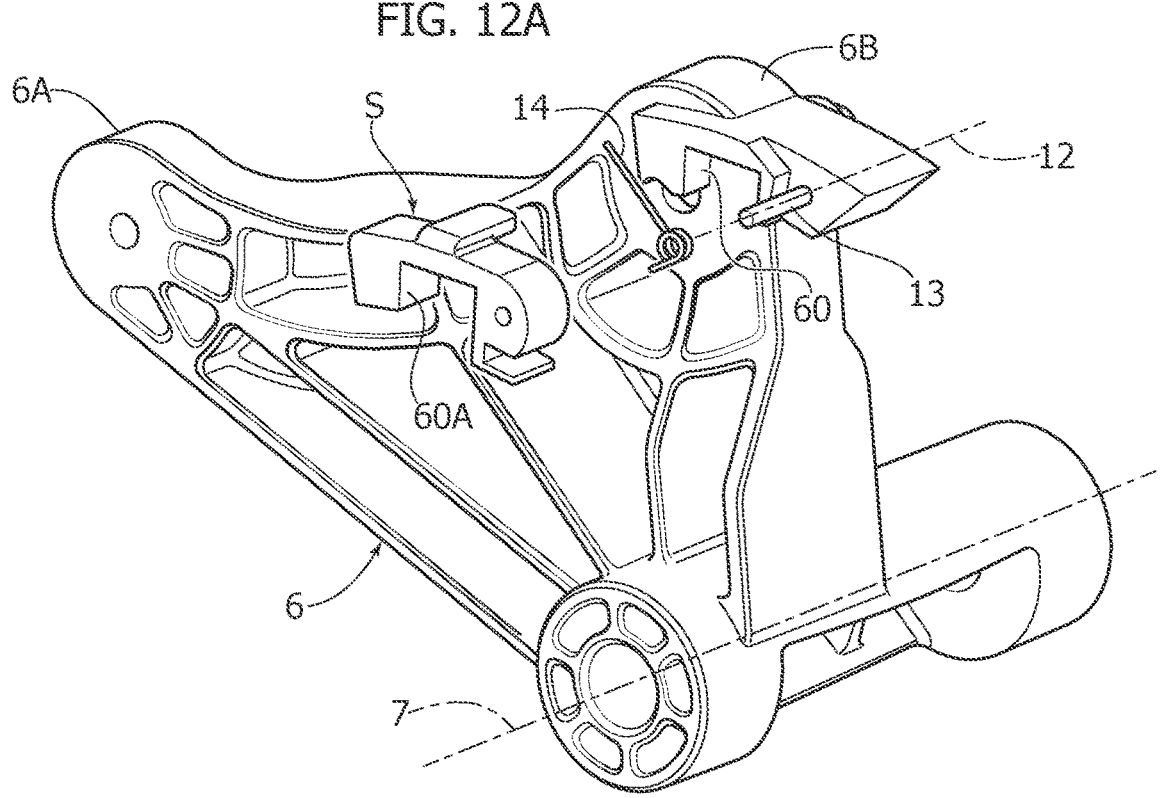
FIGS. 12A, 12B, 12C, 12D are an exploded perspective view and an assembled perspective view of the transmission member forming part of the device according to the invention.
Figure 12B:
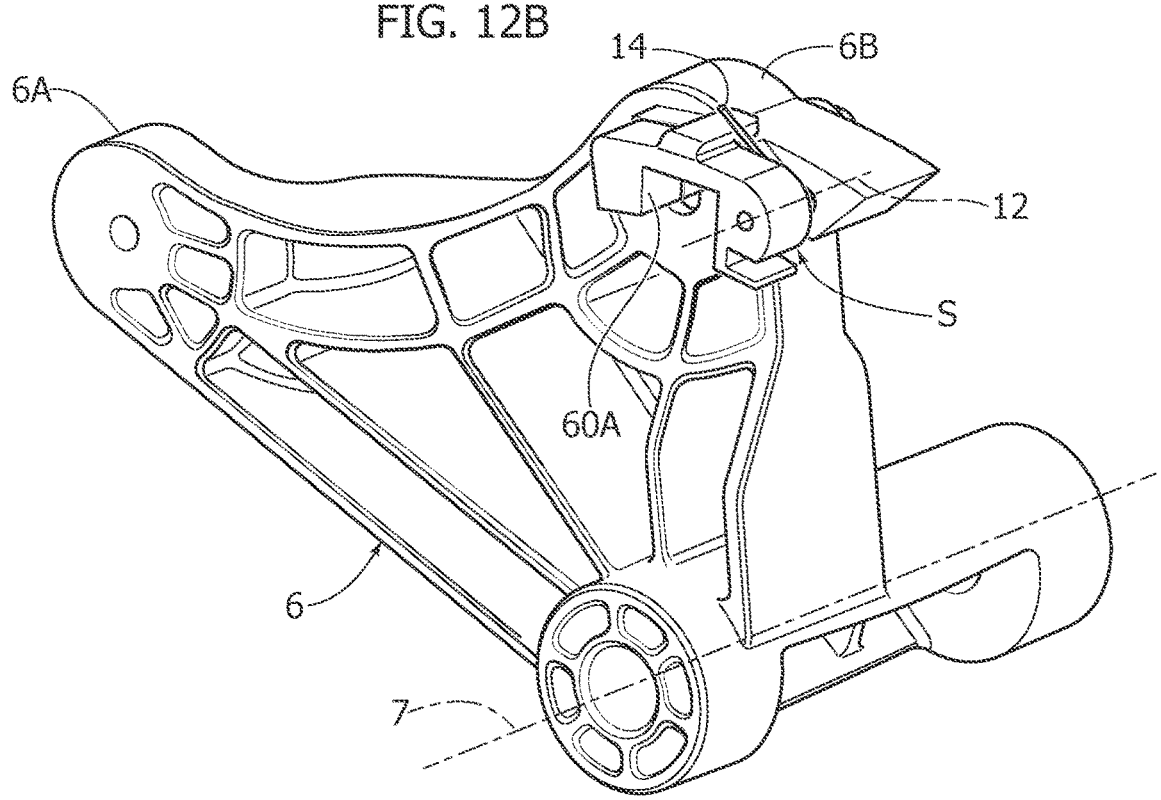
Figure 12C:
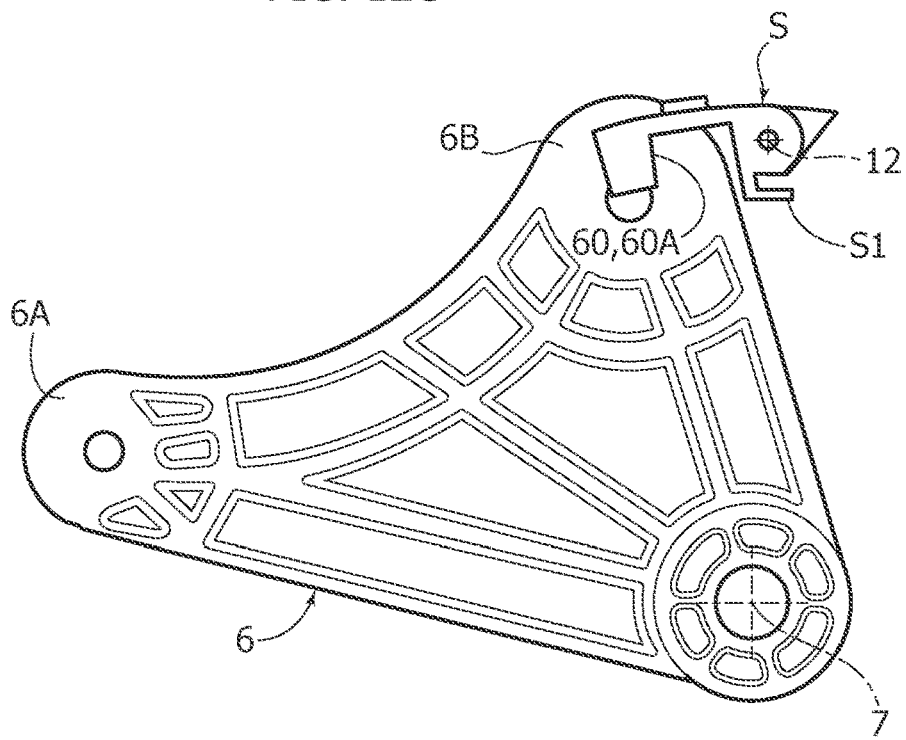

With reference to FIGS. 12A, 12B, the anti-locking pawl S is mounted articulated on the body of the transmission member 6, about an articulation axis 12 parallel to the articulation axis 7, by means of an articulation pin 13. A pin spring 14, interposed between the body of the transmission member 6 and the anti-locking pawl S, recalls the pawl S towards a rest position, in which it does not prevent the tooth 10C1 of the locking member 10 from being received within the seat 60 of the transmission member 6 in the conditions in which this is envisaged.

In the illustrated embodiment, the pawl S has a body defining an auxiliary seat 60A, which is arranged adjacent to the seat 60 of the transmission member 6 when the pawl S is in the rest position.

Figure 12D:
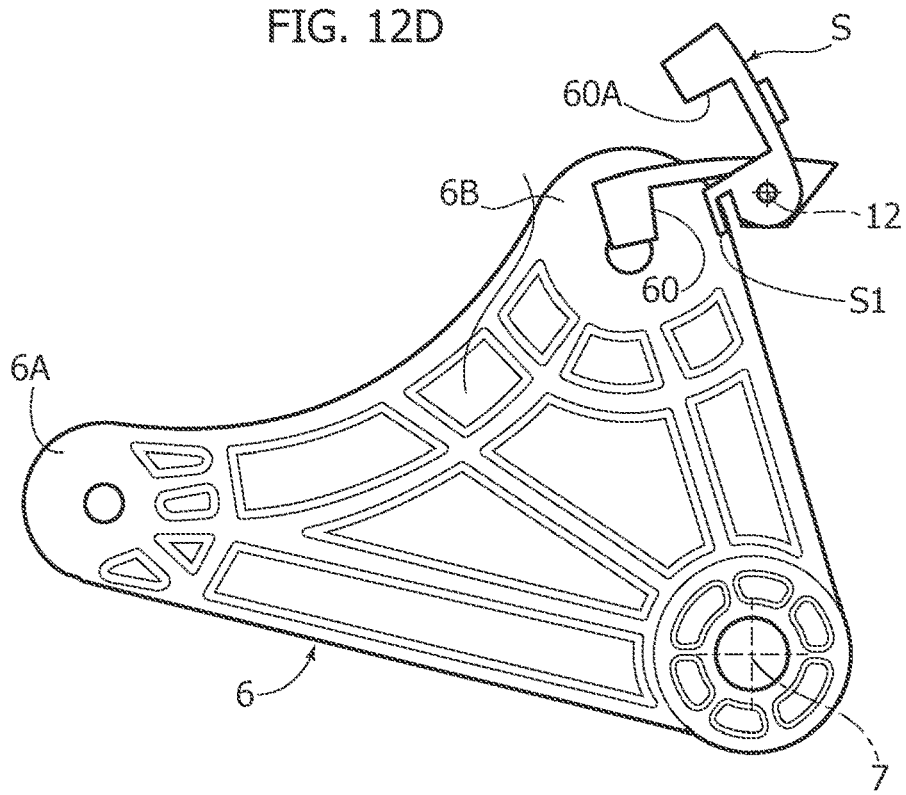

With reference to FIG. 12D, the anti-locking pawl S can be engaged, under the conditions which will be described below, by the locking member 10 so as to be arranged, against the action of the spring 14, in an operative position (illustrated in FIG. 12D) in which it obstructs entry of the seat 60, preventing the tooth 10C1 of the locking member 10 from being received in the seat 60.

Figure 13:
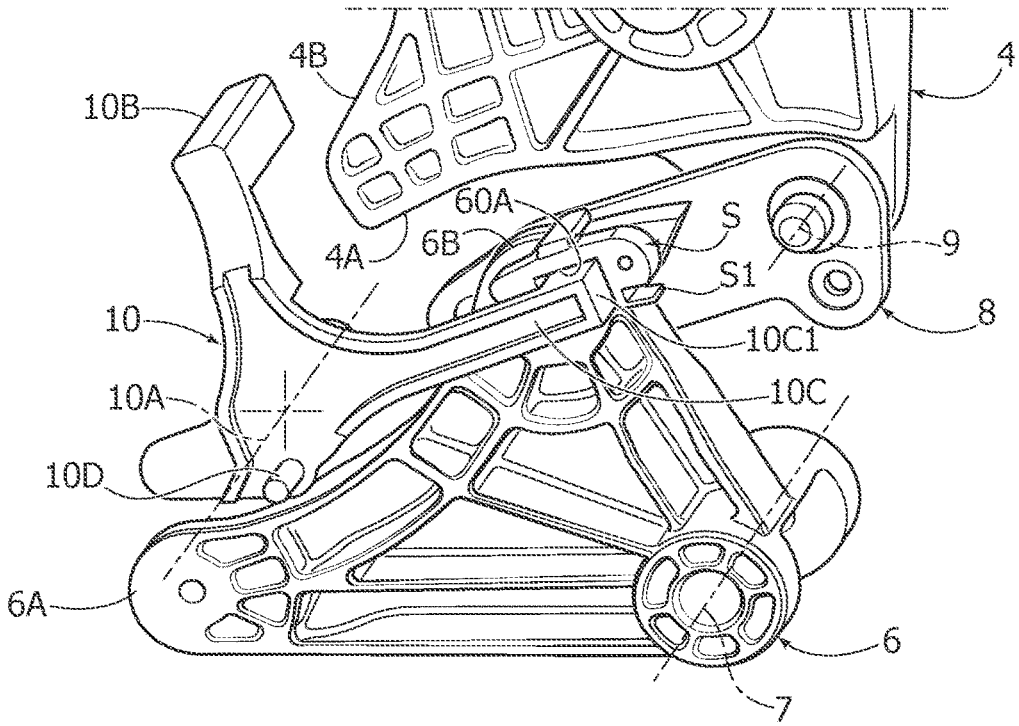
FIGS. 13, 14 are perspective views that illustrate the components of the device according to the invention, with the control lever in the neutral position (N), in a condition in which the lever is locked in the neutral position (N), and in a condition in which the lever is released from the locked condition, respectively.
Figure 14:
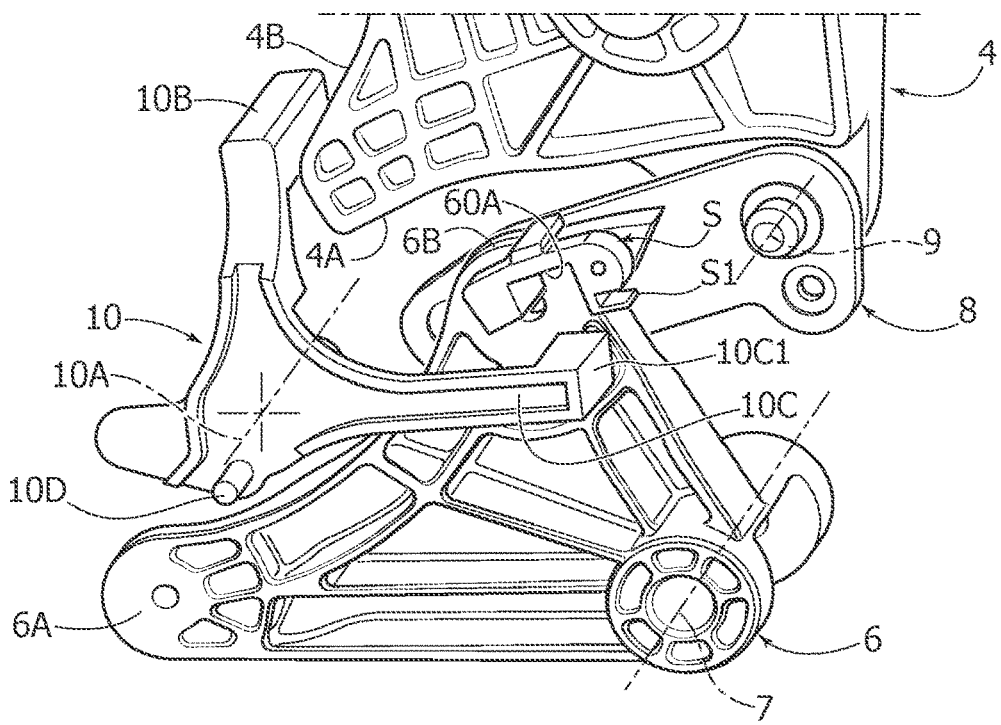

FIG. 13 shows a perspective view of the operating condition of the device according to the invention at the step corresponding to the step shown in FIG. 8B, with reference to the device of the prior art. It is assumed that the control lever 3 has been moved into the neutral position N and left in this position beyond a certain time interval, so as to activate the locking of the lever 3 in position N. As already described above, this locking is obtained as the controller E causes activation of the solenoid actuator 11, which rotates the locking member 10 in an anti-clockwise direction, causing engagement of the tooth 10C1 of the arm 10C in the seat 60. As illustrated in FIG. 13, in the case of the device according to the invention, the tooth 10C1 is received both in the seat 60, and in the auxiliary seat 60A defined by the body of the pawl S.

FIG. 4 of the attached drawings shows the operating condition in which, after locking the lever 3 in position N, the lever is released by acting on the brake pedal. Similarly to what was described and illustrated in FIG. 9B with reference to the device according to the prior art, the release from position N is obtained by acting on the brake pedal 12. In this case, this actuation causes deactivation of the solenoid actuator 11, so that the locking member 10 is rotated clockwise by its return spring of the solenoid, and the tooth 10C1 is disengaged from the seat 60 and from the seat 60A of the pawl S. The device according to the invention, therefore, has a completely analogous operation to the device according to the prior art, in the operating steps of locking (desired) of the lever 3 in position N, and of releasing the lever 3 from position N.

FIGS. 15, 16 show the operating conditions of the device according to the invention in a step in which the control lever 3 has been freed from the locked condition in the parking position P, and has moved towards position D. Assuming that the control lever 3 passes through position R and then through position N with the solenoid actuator 11 still active (since leaving the active condition has a certain delay), in the case of the device according to the invention, the drawback of the known device does not occur, i.e. unwanted locking in position N. In fact, when the lever passes into position R (FIG. 15), the locking member 10, due to the recall of the solenoid actuator 11, which is still active, continues to rotate in an anti-clockwise direction, so that the tooth 10C1 engages with the body of the pawl and causes it to rotate towards its operative position, against the action of the spring 14. When the lever 3 passes through position N (FIG. 16), assuming that the solenoid actuator 11 has not been deactivated in the meantime, the locking member 10 continues to keep the pawl S in its operative position illustrated in FIG. 16. As can be seen, in this condition, the tooth 10C1 is engaged against an attachment S1 of the anti-lock pawl S that prevents it from entering the seat 60 of the transmission member 6.

Therefore, in the case of the device according to the invention, if the control lever 3 is released from the locked condition in position P, and subsequently moved to reach position D, and if the solenoid actuator 11 has not yet been deactivated when the lever passes through position N, there is no unexpected and unwanted locking of the lever 3 in position N, since the engagement of the tooth 10C1 within the seat 60 is prevented by the anti-locking pawl S.

Of course, without prejudice to the principle of the invention, the details of construction and the embodiments may vary widely with respect to those described and illustrated purely by way of example, without departing from the scope of the present invention. For example, the pawl S can be integral with the component 10 and activated by the component 6, contrary to what is illustrated here.

In particular, the configuration of the anti-lock pawl S that is illustrated in the attached drawings is given herein purely by way of example. In particular, it is not necessary that the body of the pawl S defines a seat 60A adjacent to the seat 60 in the rest position of the pawl S. The pawl S may have a body substantially comprising only the part articulated about the axis 12, with the attachment S1. It is in fact the mutual engagement between the tooth 10C1 of the locking member 10 and this portion of the pawl S that causes rotation of the pawl S into the position shown in FIG. 16, in which the attachment S1 prevents insertion of the tooth 10C1 into the seat 60.

Moreover, the solution idea at the basis of the present invention can also be applied to different control devices from the one illustrated herein purely by way of example, with different conformations of the chain of elements that transmits the movement from the control lever 3 to the control cable of the gearbox and also, for example, with a different arrangement and/or a different sequence of the operating positions of the lever.

What is claimed is:

1. A control device for a vehicle gearbox, comprising
a support casing,
a control lever having a supporting body pivotally mounted about an oscillation axis within said support casing, and having parking, reverse, neutral and drive operating positions,
a transmission member, pivotally mounted within said support casing and operatively connected to said supporting body of the control lever, said transmission member having a first portion for connecting a gearbox control cable,
a locking member, pivotally mounted within said support casing, for locking the control lever in the parking position, said locking member being elastically recalled in a first oscillation direction, towards an operating position in which a first portion thereof interferes with said supporting body of the control lever, preventing it from moving away from the parking position,
a solenoid actuator, for rotating said locking member in a second oscillation direction, to move it away from said operating position in which it locks the control lever in the parking position,
wherein said locking member includes a further operating position towards which it can be recalled by activation of said solenoid actuator, in which a second portion of the locking member is received in a cooperating seat of a second portion of said transmission member, for locking the control lever in the neutral position, and
an electronic controller configured to activate said solenoid actuator when said control lever must be freed from a locked condition in the parking position and when said control lever must be locked in the neutral position,
an anti-locking pawl pivotally mounted on said second portion of the transmission member, having:
an operative position in which the anti-locking pawl prevents the second portion of the locking member from being received within said seat of the transmission member, and
a rest position, towards which the anti-locking pawl elastically recalled, wherein the anti-locking pawl does not prevent the second portion of the locking member from being received within said seat,
said anti-locking pawl being configured in such a way that, during passage of the control lever from the parking position to the neutral position, if said solenoid actuator remains active, the anti-locking pawl is engaged by said locking member and pushed into its operating position, thereby preventing unwanted locking of the control lever in the neutral position.

2. The control device according to claim 1, wherein said locking member has a first arm defining said first portion of the locking member and a second arm defining said second portion of the locking member and is provided with a tooth engageable within said seat.

3. The control device according to claim 1, wherein said anti-locking pawl has a body having a first portion mounted articulated to the body of said transmission member and a second portion defining an auxiliary seat that, in the rest position of the pawl, is arranged adjacent to said seat and is configured to receive therein the second portion of the locking member.

4. The control device according to claim 1, wherein said anti-locking pawl has an attachment projecting, in an overhanging manner, from a portion of the body of said pawl, which is pivotally mounted on said transmission member, said attachment being configured in such a way that, in the operating position of said anti-locking pawl, the attachment obstructs the entry of said seat thereby preventing the second portion of the locking member from being received within the seat.

* * * * *